United States Patent

Hanai

[11] Patent Number: 5,912,715
[45] Date of Patent: Jun. 15, 1999

[54] SCANNING SPEED MODULATING CIRCUIT AND METHOD

[75] Inventor: Masaaki Hanai, Kyoto, Japan

[73] Assignee: Mitsubishi Denki Kabushiki Kaisha, Tokyo, Japan

[21] Appl. No.: 08/663,905

[22] Filed: Jun. 14, 1996

[30] Foreign Application Priority Data

Jun. 14, 1995  [JP]  Japan .................................. 7-147444

[51] Int. Cl.⁶ ................................................. H04N 5/208
[52] U.S. Cl. .......................................... 348/626; 348/625
[58] Field of Search ................................. 348/625, 626, 348/627, 806, 807, 805, 26, 252, 745; 315/364, 370, 371; H04N 3/26, 5/14, 5/208

[56] References Cited

U.S. PATENT DOCUMENTS

| | | | |
|---|---|---|---|
| 2,851,522 | 9/1958 | Hollywood | 348/625 |
| 3,752,916 | 8/1973 | Lowry et al. | 348/625 |
| 4,261,014 | 4/1981 | Lee | 348/626 |
| 5,196,736 | 3/1993 | Doornhein et al. | 348/625 |
| 5,587,745 | 12/1996 | Griepentrog et al. | 348/626 |

FOREIGN PATENT DOCUMENTS

| | | | |
|---|---|---|---|
| 6-225182 | 8/1994 | Japan | H04N 5/208 |
| 1565570 | 11/1977 | United Kingdom | H04N 35/14 |
| 1589845 | 11/1977 | United Kingdom | H04N 35/14 |

*Primary Examiner*—Sherrie Hsia

[57] ABSTRACT

A method and apparatus for enhancing an edge in an image edge by controlling the electron beam scanning speed. A primary differential signal is delayed and the delayed and non-delayed signals are fed into a maximum value detection circuit and a minimum value detection circuit. A signal output by the maximum value detection signal, from which a positive alternating current component is removed, and a signal output by the minimum value detection circuit, from which a negative alternating current component is removed, are added together and synthesized. The resultant signal is passed through an amplifier circuit and then across a speed modulation coil of a cathode ray tube.

20 Claims, 9 Drawing Sheets

SCANNING SPEED MODULATING CIRCUIT AND METHOD

FIELD OF THE INVENTION

The invention relates to improvements in scanners and scanning methods. More particularly, the invention relates to an electronic beam scanning speed modulating circuit that enhances or exaggerates edges of a displayed image on a television set, a monitor, a cathode ray tube (CRT), etc., by controlling the speed of an electron beam scan.

DESCRIPTION OF THE RELATED ART

The arrangement of a conventional scanning speed modulating circuit will be explained while referring to FIGS. 11 and 12(a)–(f). In FIG. 11, the scanning speed modulating circuit includes: a differentiating circuit 1 for differentiating a video signal, i.e., a luminance signal (A); an amplifier circuit 2 for amplifying a primary differential signal (B) that is an output signal of the differentiating circuit 1; and a speed modulation coil 3 for modulating an electron beam scanning speed by an output voltage (C) of the amplifier circuit 2.

The speed modulation coil 3 is located at a predetermined position (not shown) on the neck portion of a CRT, and an electron beam scanning speed is modulated by a current that flows across the speed modulation coil 3. The luminance of a video signal is changed more drastically by, for example, increasing or decreasing the ordinary scanning speed at an image edge where the luminance of the video signal suddenly changes.

The operation of the conventional scanning speed modulation circuit will now be described by referring to FIG. 12(a)–(f). When a luminance signal (A) shown in FIG. 12(a) is input to the differentiating circuit 1, a primary differential signal (B) shown in FIG. 12(b) is output. The primary differential signal (B) is amplified by the amplifier circuit 2, and the resultant signal is supplied to the speed modulation coil 3.

FIG. 12(c) is a voltage waveform that is applied to the speed modulation coil 3, and the primary differential signal (B) shown in FIG. 12(b) is further differentiated by an inductance of the speed modulation coil 3 to produce a waveform shown by a secondary differential signal (C).

A speed modulating current, shown in FIG. 12(d), flows across the speed modulation coil 3 and generates a magnetic field that deflects the electron beam. An increase in the speed modulating current causes a corresponding increase in the strength of the magnetic field in the speed modulation coil 3 which, in turn, increases the scanning speed of the electron beam. Although the scanning speed for an electron beam varies depending on the method used for connecting a speed modulation coil, in the following explanation for this example, an electron beam scanning speed is supposed to be increased due to the rise of a speed modulating current.

At an edge transition from, for example, black to white as shown in FIG. 12(a), the rapid increase in luminance causes the electron beam scanning speed to be faster than normal. Thus, the electron beam traverses the CRT too fast and does not sufficiently excite the phosphor layer which results in a display region that is darker than normal.

A corresponding problem occurs when luminance is reduced abruptly. The scanning speed for an electron beam is modulated so that it is slower than normal due to a reduced magnetic field that occurs when the speed modulating current falls. Thus, the electron beam scans the screen too slowly and the luminance of the screen appears brighter than ordinarily. As a result, the luminance of the screen is as shown in FIG. 12(e). It should be noted that a gamma coefficient is 1 in FIG. 12(e).

In FIG. 12(e), fine line 37 indicates an example wherein no correction is made and represents the luminance change of the screen when the scanning speed is not modulated. Solid line 38 indicates an example for which a correction is made and represents the luminance change when the scanning speed is modulated.

In FIG. 12(f) is a comparative graph showing scanning speed versus horizontal screen distance.

In the example 38 in FIG. 12(e) for which the correction is made, the scanning speed is increased at a portion 40 where the luminance begins to change so as to alter the color from black to white, so that the luminance is lowered and the horizontal line is expanded. When the scanning speed is reduced at an end portion 39, the luminance is increased and the horizontal line is compressed.

As the scanning speed is reduced at a portion 39b, where the luminance begins to change so as to alter the color from white to black, the luminance is increased and the horizontal distance is compressed. As the scanning speed is increased at an end portion 40b, the luminance is reduced and the horizontal distance is extended. As a result, the luminance change from black to white, and from white to black, is sharp and the edge of the screen becomes distinct, so that it appears that the focus is improved.

There are disadvantages in the conventional scanning speed modulation circuit that is shown in FIG. 11. The first shortcoming is that, since a pulse width 41 of a pulse, which occurs in consonance with a rising time 42 of the input luminance signal (A), and a pulse width 41b of a pulse, which occurs in consonance with a falling time 42b for the input luminance signal (A) are always longer than a rising duration 42 or a falling duration 42b of the input luminance signal (A), the primary differential signal (B) that is the output of the differentiating circuit 1 has its luminance further increased at white portions that are neither the rising not the falling time, i.e., white portions 80 and 81 in FIG. 12(a), so that a strong overshoot or preshoot are induced at portions 39 and 39b at which the luminance is changed in FIG. 12(e).

Similarly, at dark portions 82 and 83 shown in FIG. 12(a), where the luminance signal (A) rises and falls, the luminance is reduced more at the portions 40 and 40b at which it is changed, and a dark shade appears, as is indicated in FIG. 12(e). Further, a width 43 of the white portion, which is shown in FIG. 12(e), is narrower than a width 79 of the white portion when the scanning speed is not modulated, and the black portion becomes extraordinarily wide.

Thus, it can be seen that the quality of an image is deteriorated in the conventional system due to these shortcomings. Due to a large change in luminance such as an edge in an image, an overshoot occurs at a portion other than the rising and falling portions of a luminance signal. Thus, a delicate image component at that portion will be damaged.

In addition, since the speed modulation affects, for a specific time, a portion other than the rising and falling portions of a luminance signal, the effect of the improvement at the edge is reduced.

All the effects provided by the conventional speed modulation do not contribute to the edge enhancement effect, which is contrary to one of the original purposes of this invention. Instead, the conventional arrangement adversely affects the image and generates barriers, such as the occurrence of an unwanted overshoot and shade, and thus, the edge enhancement effect, which is one of the original intents of this invention, is reduced.

Another shortcoming of the conventional system is that because a slight signal change,. such as ringing and noise, is amplified by increasing the speed modulation effect, it is easy to increase ringing, and the increase of the speed modulating effect adversely influences a minute signal that indicates subtle image features such as the border of slight shadows on a face, etc., and results in an unnatural facial image.

SUMMARY OF THE INVENTION

This invention is made to solve the above-described problems. It is an object of the invention to provide a scanning speed modulating circuit that has the advantage of being able to make a sharp edge without causing a strong overshoot around an edge portion at which the luminance of an image is drastically changed, without deteriorating image quality due to the occurrence of a black shadow, and without either narrowing the width of a white portion or extending the width of a black portion.

It is another object of the invention to reduce ringing and to increase the effect of speed modulation at a portion of the image which should be affected by it, while preventing adverse effects on a slight shadowed portion, such as a shadow on a head that has only a small luminance change.

A scanning speed modulation circuit according to the invention, which exaggerates an outline or an edge within a video image by using a scanning speed modulation coil, includes: an edge detector for detecting a change in luminance of an input video signal and for outputting a pulse signal corresponding to a luminance changed portion; a time span shortener for reducing, to a predetermined value, a time span for the pulse signal input by the edge detector means, and for outputting a compensated pulse signal for which the time span has been compensated; and an amplifier for amplifying the compensated pulse signal input by the time span shortener and for transmitting an output signal to the scanning speed modulation coil.

Accordingly, by using the time span shortener, the pulse width of the edge detection signal, which is a luminance signal, is shortened so as to restrict, as much as possible, the time span wherein the pulse time width exceeds the rising time and the falling time of the luminance signal. It is therefore possible to provide a scanning speed modulation circuit than can prevent image deterioration due to the occurrence of a strong overshoot or a black shadow near the edge portion, by which the luminance of an image is drastically changed, and that can improve the image quality by effectively sharpening the edge without narrowing a white portion or widening a black portion.

In addition, since the ringing components having a small amplitude that exist near the bias are cut out, a problem such as the scanning speed modulation acting on the ringing portion and exaggerating it can be prevented.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF PREFERRED EMBODIMENTS

Embodiment 1

Figure 1:
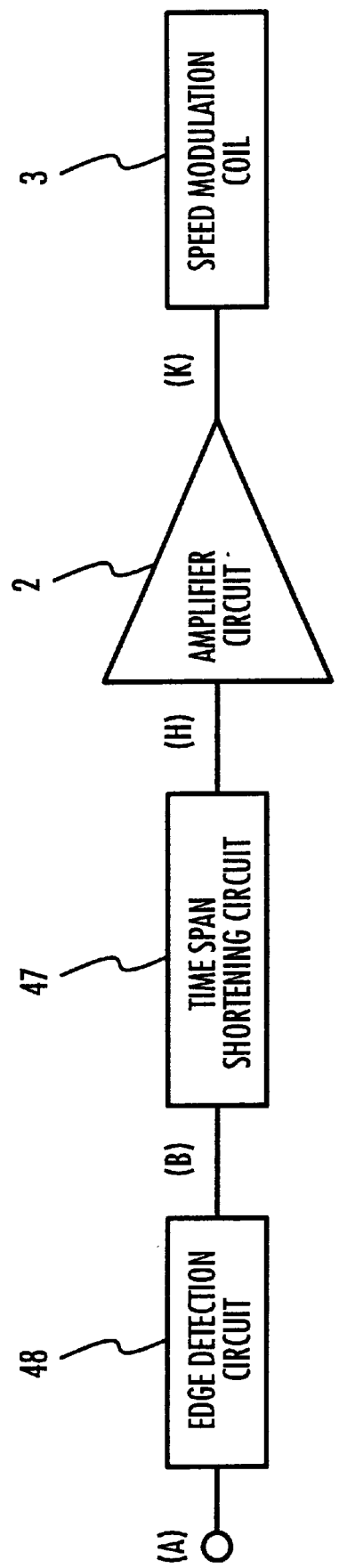
FIG. 1 is a diagram illustrating the arrangement of a scanning speed modulation circuit according to Embodiment 1 of the invention.

An embodiment of the invention will now be described while referring to drawings. In the drawings, the same reference numbers as are used for the prior art are also used to denote corresponding or identical components.

FIG. 1 is a schematic diagram illustrating the arrangement for an example of the scanning speed modulation circuit according to the invention. In this diagram, the scanning speed modulation circuit includes an edge detection circuit 48 that detects an edge portion of an input video signal, i.e., a luminance signal (A) at which a gray scale is changed, and outputs an edge detection pulse signal that corresponds to a portion where the luminance is changed; a time span shortening circuit 47 that reduces the time span for an edge detection pulse signal that is input from the edge detection circuit 48, and outputs a compensated pulse signal whose time span has been compensated; an amplifier circuit 2 that amplifies a signal output by the time span shortening circuit 47; and a speed modulation circuit 3 that modulates an electron beam scanning speed with an output voltage of the amplifier circuit 2.

Figure 2:
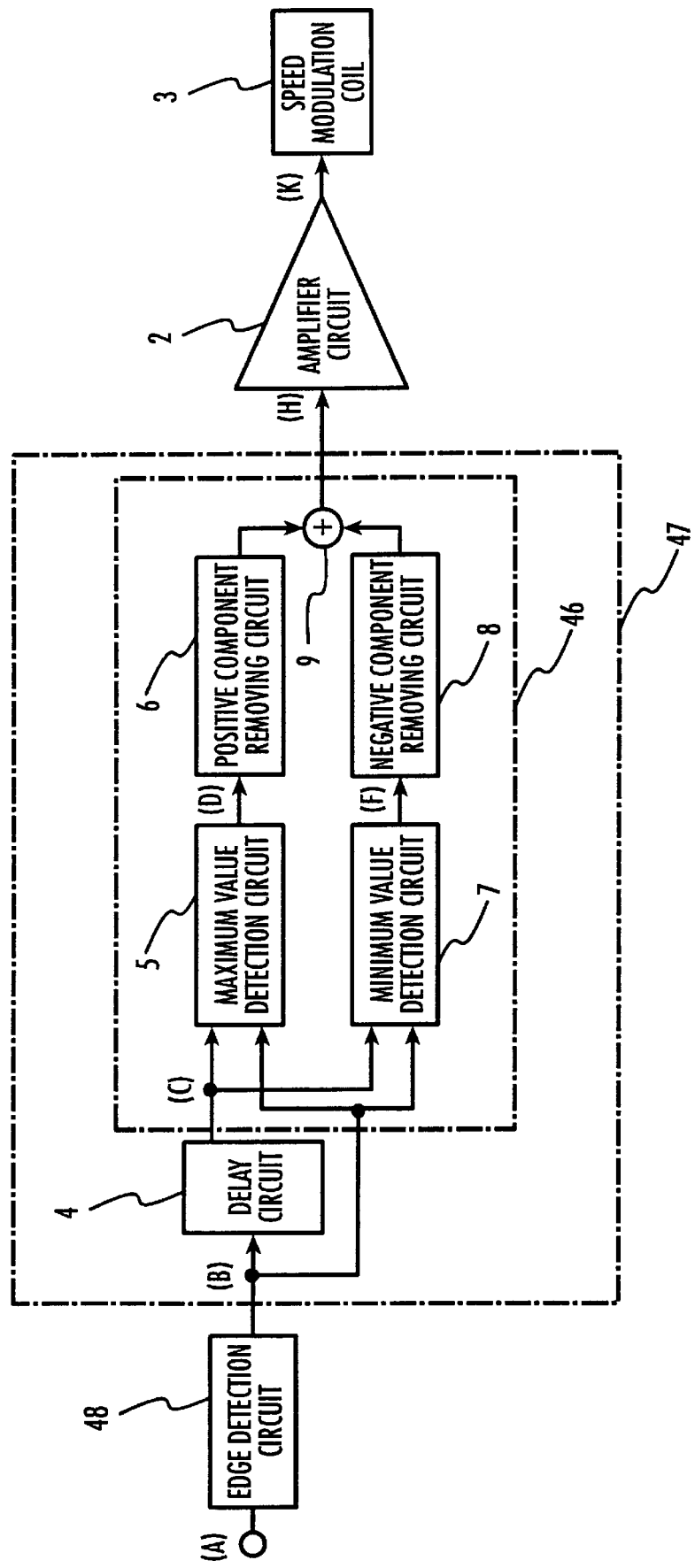
FIG. 2 is a specific circuit diagram illustrating the scanning speed modulation circuit according to Embodiment 1 of the invention shown in FIG. 1.

In FIG. 2 is shown a specific example of the time span shortening circuit 47 in FIG. 1, which is a schematic structural diagram of Embodiment 1.

As is shown in FIG. 2, the time span shortening circuit 47 includes a delay circuit 4, which delays for a predetermined time an edge detection pulse signal (pulse signal) that is output by the edge detection circuit 48 and outputs a delayed pulse signal. A maximum value detection circuit 5, which at the same time receives a pulse signal from the edge detection circuit 48 and a delayed pulse signal from the delay circuit 4, detects at individual times a maximum voltage value of each of these signals. A positive component removing circuit 6 removes a positive component from a signal output by the maximum value detection circuit 5. A minimum detection circuit, which at the same time receives a pulse signal from the edge detection circuit 48 and a delay pulse signal from the delay circuit 4, detects at individual times a minimum voltage value of each of these signal. A negative component removing circuit 8 removes a negative component from a signal output by the minimum value detection circuit. An adder 9 adds together signals output by the positive component removing circuit 6 and by the negative component removing circuit 8 so as to synthesize these signals, and outputs a pulse signal whose time span is compensated as an output signal (H) of the time span shortening circuit 47.

It should be noted that reference number 46 denotes a compensated waveform synthesizing portion in the time span shortening circuit 47.

The edge detection circuit 48 may constitute for example, a differentiating circuit that detects the edge portion of an input luminance signal (A) by performing differentiation of the luminance signal. A resultant primary differential signal (B) is transmitted to the delay circuit 4, the maximum value detection circuit 5, and the minimum value detection circuit 7.

A delayed primary differential signal (C), which is passed through the delay circuit 4 and is delayed for predetermined time τ, is input to the maximum value detection circuit 5 and the minimum value detection circuit 7.

The maximum value detection circuit 5 detects at an identical time a maximum value of the primary differential signal (B) that is input by the edge detection circuit 48 and of the delayed differential signal (C) that is input by the delay circuit 4. Its output signal (D) is transmitted to the positive component removing circuit 6.

Likewise, the minimum value detection circuit 7 is a circuit that detects at an identical time a minimum value of the input primary differential signal (B) and of the input delayed primary differential signal (C). Its output signal (F) is transmitted to the negative component removing circuit 8.

Reference number 9 denotes an adder, that receives an output signal (E) from the positive component removing circuit 6 and an output signal (G) from the negative component removing circuit 8, adds them together, and outputs a compensated edge detection signal (H), which is obtained within the time span of the primary differential signal (B) that is compensated so that it has a shorter pulse duration.

The compensated edge detection signal (H) is sent to the amplifier 2 that amplifies that signal (H). The amplified compensated edge detection signal (K) is supplied to the speed modulation coil 3 and to modulate the electron beam scanning speed.

In FIGS. 3(a)–(e) are shown signal waveforms for individual sections in FIG. 2. The vertical axis represents a voltage and the horizontal axis represents time.

FIG. 3(a) shows an input luminance signal (A) having a trapezoid-shaped waveform.

A solid line 33 in FIG. 3(b) represents the waveform of primary differential signal (B), which is a signal output by the edge detection circuit 48, and a dashed line 34 represents delayed primary differential signal (C) of the delay circuit 4.

FIG. 3(c) shows the waveform of output signal (D) from the maximum value detection circuit 5 and shows the waveform of output signal (F) from the minimum value detection circuit 7.

Figure 3:
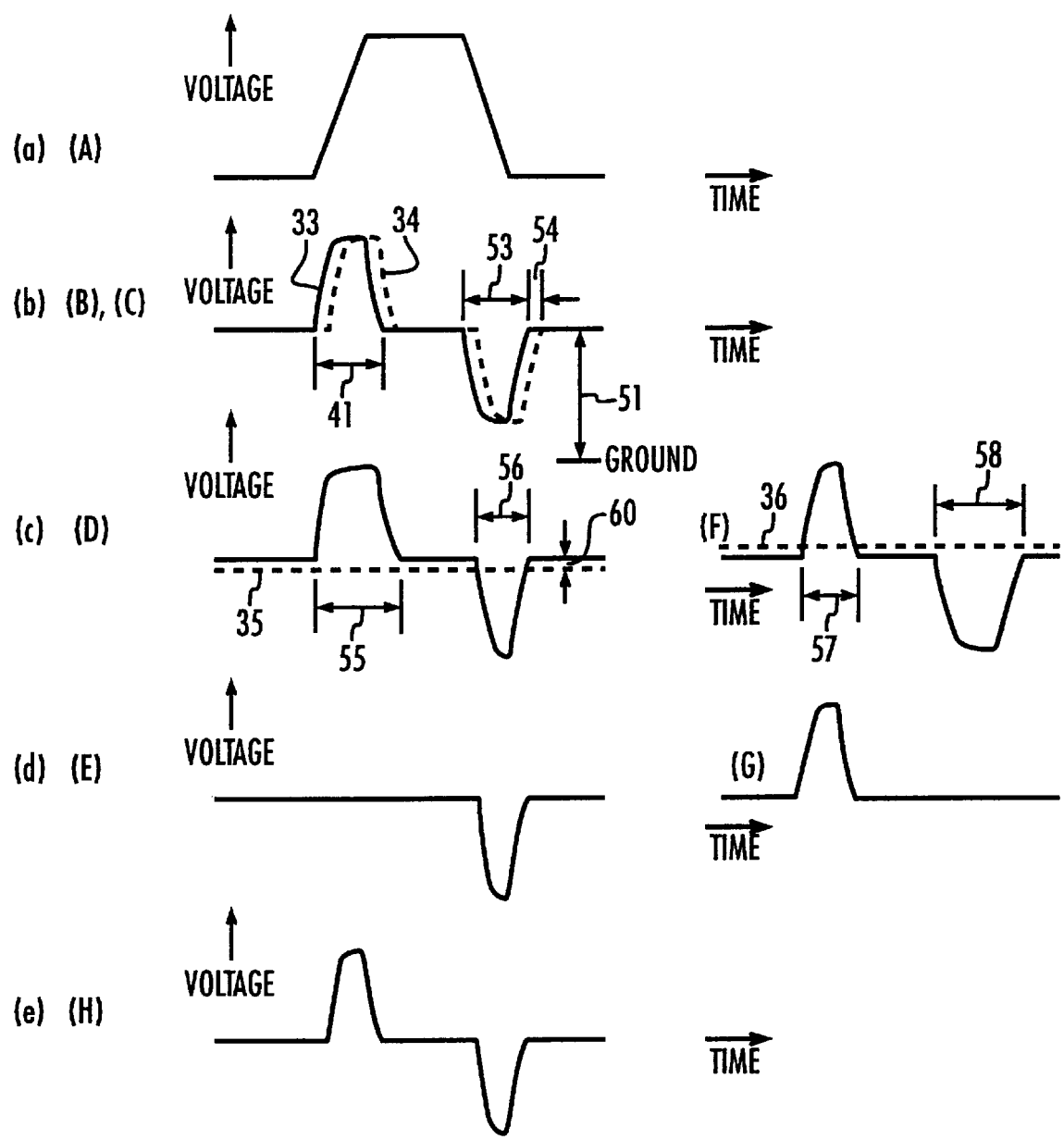
FIG. 3(a), 3(b), 3(c), 3(d) and 3(e) are diagrams showing signal waveforms of the individual sections shown in FIG. 2.

In FIG. 3 (c), reference number 35 denotes a removal reference voltage Vα for the positive component removing circuit 6. The positive component removing circuit 6 removes or clips a voltage for the waveform of the signal (D) that is higher than the reference voltage. It should be noted that the removal reference voltage 35 is set at a level at which some negative components are clipped, so that ringing can be removed.

In FIG. 3(c), reference number 36 denotes a removal reference voltage Vβ for the negative component removing circuit 8. The negative component removing circuit 8 removes or clips a voltage for the waveform of signal (F) that is lower than the reference voltage. Similarly, the removal reference voltage 36 is set at a level at which some positive components are clipped so that ringing can be removed.

In FIG. 3(b), reference number 51 denotes a bias voltage for the primary differential signal (B) and for the primary differential signal (C) after it is delayed. The bias voltage 51 is an electric potential relative to a ground for a portion wherein there is no gray scale change of the input luminance signal (A), and a primary differential voltage is not generated. In other words, this is no-signal level of the primary differential signal (B) and of the delayed primary differential signal (C), which are alternative signals. As for the signal (B) and (C), a voltage waveform portion whose voltage is higher than the bias voltage 51 is defined as a positive component, while to the contrary, the voltage waveform portion whose voltage is lower is defined as a negative component. The positive and negative components are defined in the same manner as are the other output signal (D), (F), (E), (G) and (H).

Reference number 41 shown in FIG. 3(b), denotes time span TP for a positive pulse of the primary differential signal (B) (indicated by solid line 33), which is a signal output by the edge detection circuit 48. Reference number 53 denotes time span TM for a negative pulse of this waveform (indicated by the solid line 33). Reference number 54 denotes a delay time τ between primary differential signal (B) and delayed primary differential signal (C). Reference number 55 in FIG. 3(c) denotes positive pulse time span TPmax when a maximum value is detected, and, accordingly, 56 denotes negative pulse time span TMmin.

Further, reference number 57 denotes a positive pulse time span TPmin when the minimum value is detected, and 58 denotes negative pulse time span TMmax.

Reference number 60 denotes a minute voltage difference Vα between a zero reference voltage and a removal reference voltage for a voltage waveform of signal (D), which is indicated by the solid line.

The operation of Embodiment 1 will now be explained while referring to FIGS. 2 and 3.

The input luminance signal (A) is differentiated by the edge detection circuit 48 and a pulse voltage is extracted for a portion at which the gray scale of the luminance signal changes. This is the primary differential signal (B) shown in FIG. 3 (b). A signal that is passed through the delay circuit 4 and is delayed for a predetermined time τ is input, as a delayed primary differential signal (C), also shown in FIG. 3 (b), together with the primary differential signal (B) to the maximum value detection circuit 5 and the minimum value detection circuit 7.

The maximum value detection circuit 5 detects the maximum voltage of each primary differential signal (B) and each delayed primary differential signal (C), and outputs signal (D) shown in FIG. 3(c) to the positive component removing circuit 6. As is shown in FIG. 3(d), the positive component removing circuit 6 outputs a signal (E) that is obtained by removing a positive component from an input signal (D).

On the other hand, the minimum value detection circuit 7 detects the minimum voltage value for the primary differential signal (B) and the delayed primary differential signal (C) for each time, and outputs a signal (F) in FIG. 3(c) to the negative component removing circuit 8. The negative component removing circuit 8, as is shown in FIG. 3(d), outputs a signal (G) that is obtained by removing a negative component from the input signal (F).

The signal (E) and (G) shown in FIG. 3(d) are added together and synthesized by the adder 9, and the resultant signal is input, to the amplifier 2, as a primary differential signal (H), which is compensated edge detection signal whose time span has been compensated. The primary differential signal (H) is amplified by the amplifier 2 and the resultant signal is supplied to the speed modulation coil 3.

Suppose that the luminance signal (A) having a trapezoid-shaped waveform, as is shown in FIG. 3(a), is input to the edge detection circuit 48 that is a differentiating circuit. With the voltage level of the bias voltage 51 being zero as a reference, as is indicated by the solid line 33 in FIG. 3(b), a positive pulse is generated at a corresponding portion where the input luminance signal (A) rises from black to white in the primary differential signal (B) that is output by the edge detection circuit 48, and a negative pulse is generated at a corresponding portion where the input luminance signal (A) falls from white to black.

The waveform indicated by the broken line 34 is that of the delayed primary differential signal (C) that is obtained by passing the waveform indicated by the solid line 33 through the delay circuit 4 and delaying that waveform for a predetermined time τ.

As for the maximum detection circuit output signal (D) in FIG. 3(c), the maximum voltage value of the waveforms that are indicated by the solid line 33 and the broken line 34 is detected at individual times by the maximum value detection circuit 5. The resultant positive pulse is a logical sum of a positive pulse of the solid line 33 and a positive pulse of the broken line 34. A time span 55 of the resultant positive pulse, i.e., TPmax is $$TP\ max = Tp + \tau$$

and the time span is thus increased by τ.

Since the resultant negative pulse is a logical sum of a negative pulse of the solid line 33 and a negative pulse of the broken line 34, a time span 56 of the resultant pulse, i.e., TMmin, is $$TM\ min = TM - \tau$$

and the resultant pulse time span is rendered shorter than TM of a pulse span 53 for the original primary differential signal by the subtraction of the delay time τ.

Then, the positive component removing circuit 6 cuts out a portion, of the waveform of the maximum value detection circuit output signal (D), in which a voltage is higher than a removal reference voltage 35 (Vα), and clips it to the removal reference voltage 35 (Vα) to provide a signal waveform of (E).

The signal waveform of the output signal (E) in FIG. 3(d) is provided so that only a negative waveform whose time span is shortened is extracted from the signal waveform of the maximum value detection circuit output signal (D), and a positive pulse whose time span has been increased is removed.

A minute voltage 60 (Vα) shown in FIG. 3(c), partially on the negative voltage side, is cut because that is effective for the elimination of ringing and noise.

As for the maximum detection circuit output signal (F) in FIG. 3(c), the minimum voltage value of the waveforms that are indicated by the solid line 33 and the broken line 34 is detected at individual times by the minimum value detection circuit 7. A resultant positive pulse is a logical product of a positive pulse of the solid line 33 and a positive pulse of the broken line 34. A time span 57, i.e., TPmin, is $$TP\ min = TP - \tau$$

and the pulse time span is rendered shorter than TP of a pulse span 41 of the original primary differential signal (B) by the subtraction of the delay time τ.

Since the resultant negative pulse is a logical sum of a negative pulse of the solid line 44 and a negative pulse of the broken line 34, a time span 58, i.e., TM max, is $$TM\ max = TM + \tau$$

and the time span is increased.

Then, the negative component removing circuit 8 cuts out a portion, of the waveform of the minimum value detection circuit output signal (F), in which a voltage is lower than a removal reference voltage 36, and clips it to the removal reference voltage 36 to provide a signal waveform (G).

The signal waves of the output signals (E) and (G) in FIG. 3(d) are added together and synthesized to provide signal wave (H) in FIG. 3(e). As a result, the spans of both the positive pulse and the negative pulse are so reduced that they are shorter than a time span of the original differential signal (B).

The effect that is obtained by this embodiment of the invention will now be described while referring to FIGS. 4(a)–(f).

The waveforms of signal (A), (B), (C), and (H) shown in FIG. 4(a) through (c) correspond to signals (A), (B), (C) and (H) shown in FIG. 3(a), (b) and (e).

Speed modulation signal (L) shown in FIG. 4(d) represents a speed modulation current that flows across the speed modulation coil 3. The vertical axis represents current and the horizontal axis represents time.

Luminance signal (M) shown in FIG. 4(e) shows a change in luminance on a display screen. The vertical axis represents luminance and the horizontal axis represents horizontal distance on a screen. A gamma coefficient is 1.

Reference number 44 denotes a luminance when scanning speed modulation is not performed, and 45 denotes the effect relative to the luminance when scanning speed modulation according to the embodiment of the invention is performed.

Scanning speed function (N) shown in FIG. 4(f) represents a change in the scanning speed, where the vertical axis indicates scanning speed and the horizontal axis indicates horizontal distance on a screen. While scanning speed is normal at a portion where there is no luminance change, scanning speed N is increased at a portion 72 that corresponds to a rising portion 70 of the speed modulation current (L), and the scanning speed N is reduced at a portion 73 that corresponds to a falling portion 71.

The luminance (M) portion 74 on a display screen, shown in FIG. 4(e), electron beam scanning speed is so modulated by the magnetic field that is generated by the speed modulation coil 3 at the rising portion 70 of the speed modulation current (L), so that the scanning speed is increased until it is higher than normal. Since an electron beam scans fast, the luminance of a display screen lost more quickly than ordinary, and the display screen seems darker (more blackish).

Accordingly to an expression in which speed x time=distance, when the scanning speed (N) is increased at the portion 72 (with the time 75 unchanged), a horizontal distance 76 on the screen is extended.

At the falling portion 71 of the speed modulation current (L), electron beam scanning speed is so modulated by a magnetic field that is generated by the speed modulation coil 3 that is slower than ordinary and an electron beam scans at a slower speed. Thus, the luminance on the display screen is not easily lost and appears brighter (whiter).

According to an expression in which speed x time=distance, when the scanning speed (N) is so modulated at the portion 73 that it is lower and the time 77 shown in FIG. 4(d) is unchanged, a horizontal distance 78 on a screen is reduced.

As a result, the luminance (M) on the display screen is darker at the beginning of a rising portion where the input luminance signal (A) turns from black to white, and the horizontal distance on the screen is extended. On the other hand, when the luminance signal changes from white to black, the luminance is brightened and the horizontal distance is shortened.

In this manner, there appears to be a sharp rise in the luminance. Likewise, the luminance is increased at the beginning of the falling portion where white is changes to black, and the horizontal distance is shorted. The luminance is darker at the end, and the horizontal distance is extended, so that the luminance also seems to fall sharply.

Figure 12:
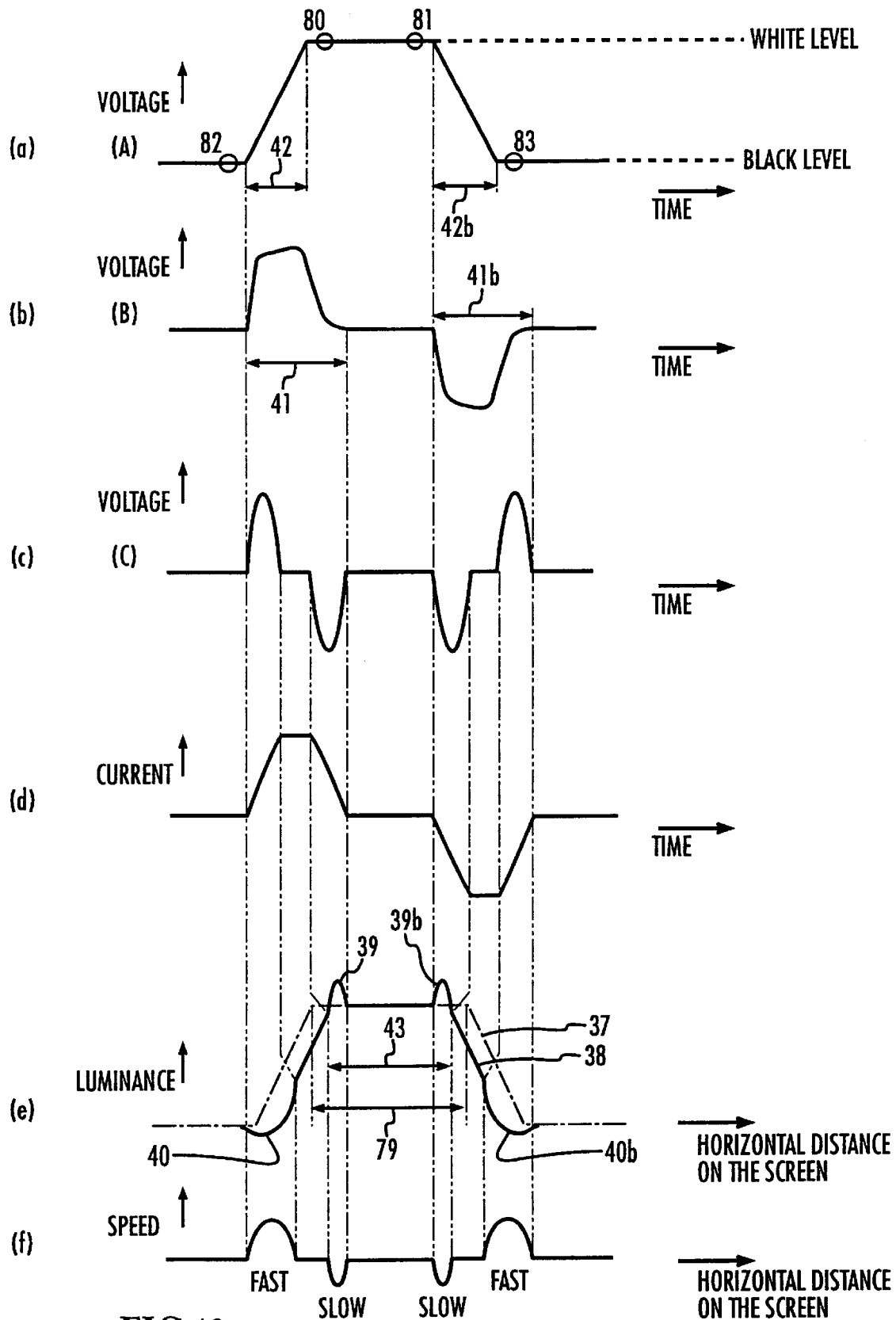
FIGS. 12(a), 12(b), 12(c), 12(d), 12(e) and 12(f) are diagrams for explaining the operation of the conventional scanning speed modulation circuit shown in FIG. 11.

A great difference from FIG. 12 that shows the effect of the prior art is that: in FIG. 12, since the pulse time span 41 of the primary differential signal (B) is longer than the rising time span 42 of the input luminance signal (A), the scanning speed modulation acts on a non-rising portion so that the luminance of an originally flat, white portion is increased and a strong overshoot shown in the end portion 39 appears, or the luminance of an originally flat, black portion is decreased more and a black shadow as is shown by the beginning portion 40 appears, or the width 43 of a white portion shown in FIG. 12(e) becomes narrower than the width portion when scanning speed modulation is not performed.

Figure 4:
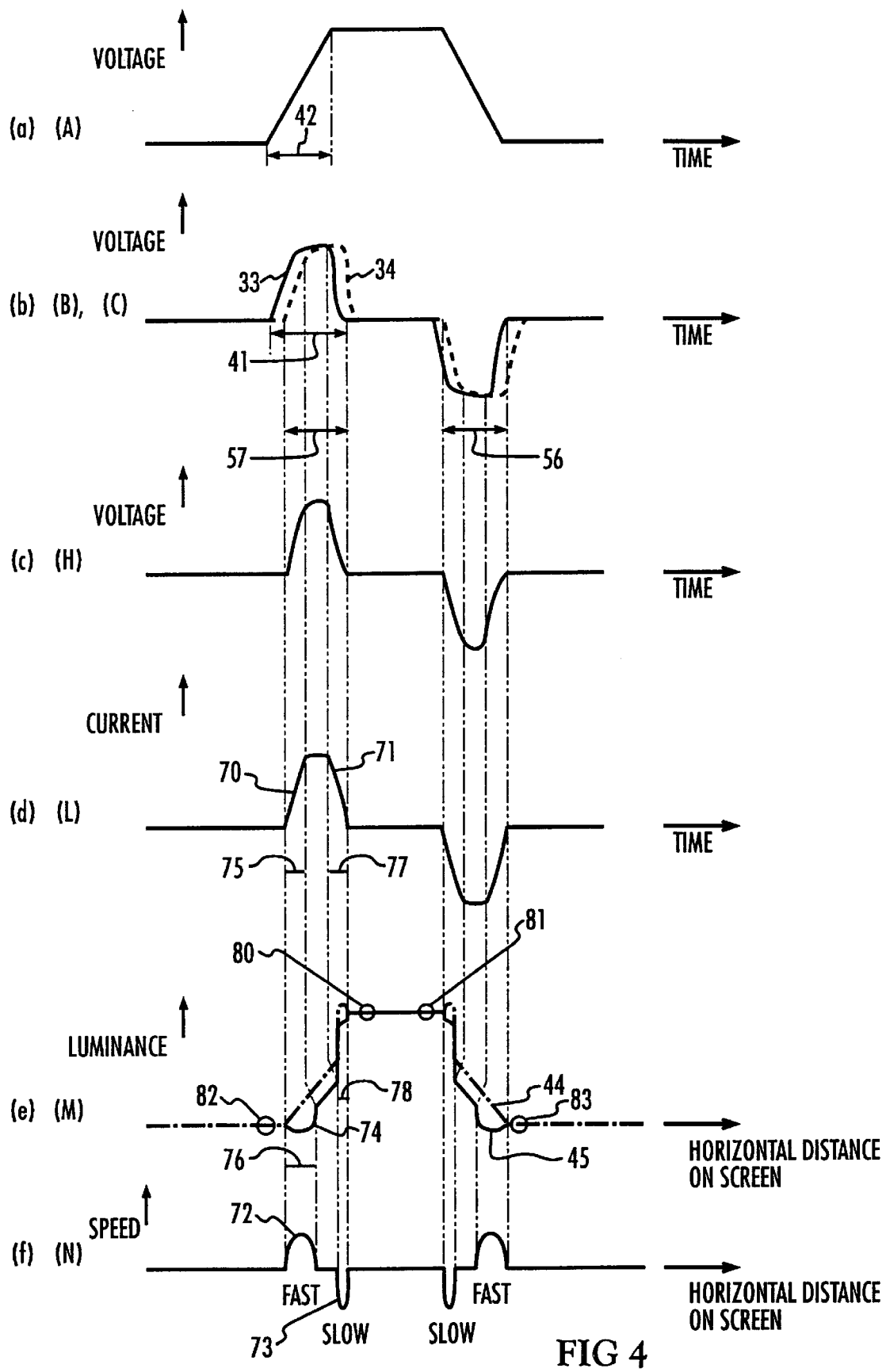
FIG. 4(a), 4(b), 4(c), 4(d), 4(e) and 4(f) are diagrams showing signal waveforms for explaining the operation in Embodiment 1 of the invention.

On the other hand, the present invention as shown in FIG. 4, the time span 41 of the primary differential signal (B), which is wider than the rising time span 42 of the input luminance signal (A), is so set that it falls within the rising time span 42 of the luminance signal by reducing the time span 57 to (TP−τ). Therefore, the luminance change on the display screen occurs only within the rising time of the luminance signal (A), so that scanning speed modulating is not performed at the non-rising, bright, flat portion 80 and 81. Overshoot and preshoot are rarely caused by this circuit, and scanning speed modulation is not performed at non-rising, dark, flat portion 82 and 83 so that a black shadow rarely occurs.

Since the compression and extension of the horizontal distance occur within the rising time, the white portion will not be narrower than that at 44 when the scanning speed modulation is not performed. An ideal case is where the delay time τ of the delay circuit 4 in FIG. 4 is (rising time 42)=(pulse width 41 of the primary differential signal)−τ.

and although actually this relationship differ slightly in consonance with images that have different rising times, almost equivalent effects can be acquired.

Either a digital circuit or an analog circuit can be employed for the time span shortening circuit 47 and the edge detection circuit 48 in this embodiment. In an arrangement for adjusting the effect by controlling the delay time τ, or an arrangement wherein the delay circuit 4 is replaced with a low-pass filter, a band-pass filter over a high-pass filter can be employed to generate a delay time. That is, a low-pass filter, a band-pass filter, or a high-pass filter can serve as the delay circuit of the present invention.

An arrangement wherein an amplifier is inserted into the front and the rear of the edge detection circuit 48 to adjust an amplitude, or an arrangement with a variable gain can also be employed with the invention.

Figure 5:
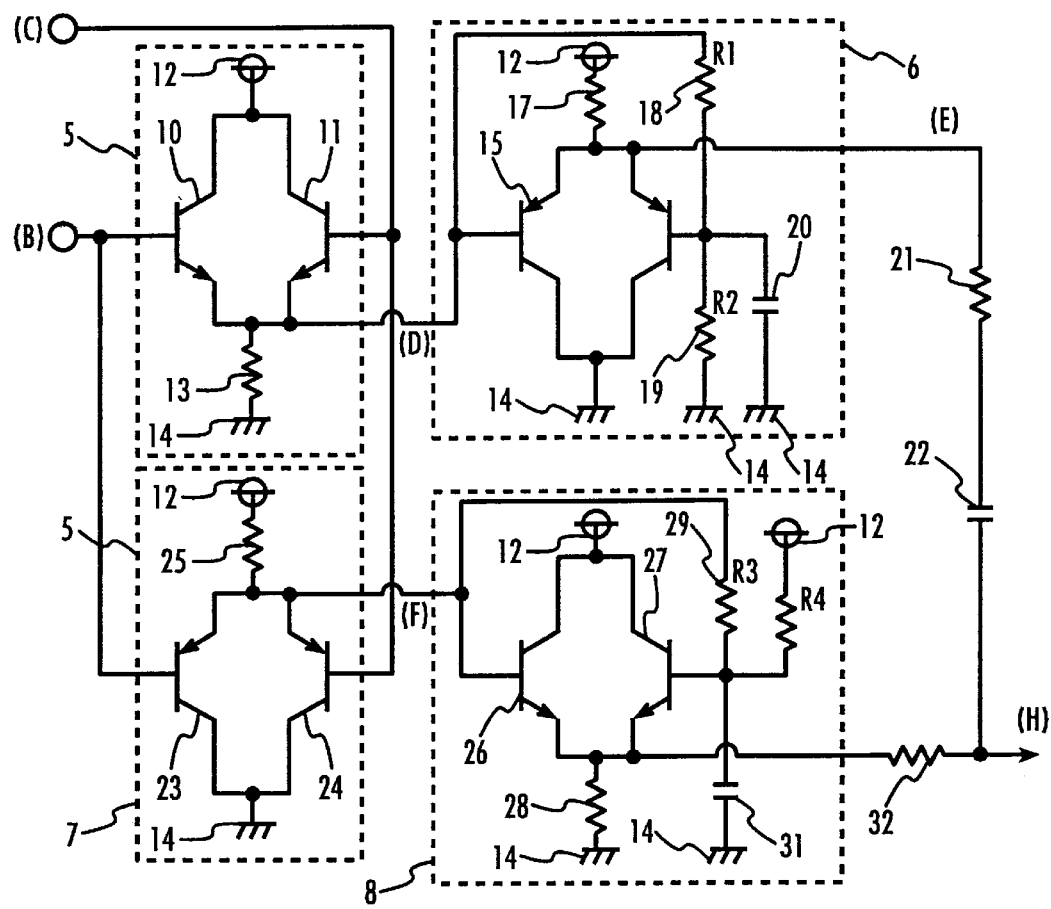
FIG. 5 is a diagram showing a circuit example for a compensated waveform synthesizing portion in a time span shortening circuit 47 according to Embodiment 1 of the invention.

FIG. 5 is a diagram showing an actual circuit example for a compensated waveform synthesizing portion 46 in the time span shortening circuit 47 shown in FIG. 2. The primary differential signal (B) is input to the bases of a PNP transistor 10 of the maximum value detection circuit 5 and a PNP transistor 23 of the minimum value detection circuit 7, respectively. The delayed primary differential signal (C) is sent to the bases of a PNP transistor 11 in the maximum value detection circuit 5 and to a PNP transistor 24 in the minimum value detection circuit 7, respectively.

In the NPN transistors 10 and 11 in the maximum value detection circuit 5, their collectors and emitters are connected in common, with the collectors being connected to a power source 12 and the emitters being connected to a GND 14 across a resistor 13.

The emitter of the NPN transistors 10 and 11, i.e., the output terminal (D) of the maximum value detection circuit 5, is connected to a base of a PNP transistor 15 of the positive component removing circuit 6, and is also connected to the base of a PNP transistor 16 across a resistor 18.

The output terminal (D) is further connected to a resistor 19 and a capacitor 20. The resistor 19 and the capacitor 20 are connected at their other ends to the GND 14. In the PNP transistors 15 and 16, their collectors and the emitters are connected in common, with the collectors being connected to the GND 14 and the emitters being connected to the power source 12 across a resistor 17. A signal output by the emitters of the PNP transistors 15 and 16 that is connected in common is an output signal (E) of the positive component removing circuit 6.

Similarly, the collectors and the emitters of the PNP transistors 23 and 24 in the minimum value detecting circuit 7 are connected in common. The common collector is connected to the GND 14, while the common emitter is connected to the power source 12 across a resistor 25. The common emitter of the PNP transistors 23 and 24, i.e., the output (F) of the minimum value detection circuit 7, is connected to the base of an NPN transistor 26 of the negative removing circuit 8, and is also connected to the base of an NPN transistor 27 across a resistor 29. In adder, it is connected to a resistor 30 and to a capacitor 31.

The other end of the resister 30 is connected to the power source 12, while the other end of the capacitor 31 is connected to the GND 14.

The collectors and emitters of the NPN transistors 26 and 27 are connected in common. The common collector is connected to the power source 12 and the common emitter is connected to the GND 14 across a resistor 28.

A signal from the commonly connected emitters of the PNP transistors 26 and 27 serves as an output signal (G) of the negative component removing circuit 8.

The output signal (E) of the positive component removing circuit 6 is added through the resistor 21 and the capacitor 22, while the output signal (G) of the negative component removing circuit 8 is added across the resistor 32, so that the output signal (H) of the time span shortening circuit 47 is provided.

The operation in FIG. 5 will now be described. The emitters of the NPN transistors 10 and 11 are connected in common. Relative to the primary differential signal (B) that is sent to the base of the NPN transistor 10 and the delayed primary differential signal (C) that is sent to the base of the npn transistor 11, whichever of the transistors that receives a signal with a higher voltage is selectively rendered on to introduce a current to the resistor 13.

Either the voltage for the primary differential signal (B) or the voltage of the delayed differential signal (C) is increased or decreased in accordance with the timing, and the transistor that receives the signal, either the primary differential signal (B) or the delayed primary differential signal (C), that has the higher voltage is selectively rendered on.

The emitter voltage of the NPN transistors 10 and 11 is defined as VE10,11+vE10,11(t) (VE10,11 is for a direct current component and vE10,11(t) is for an alternating current component), a voltage of the primary differential signal (B) is defined at VO+vB(t) (VO is for a direct current component and vB(t) is an alternating current component), and a voltage of the delayed primary differentiating signal (C) is defined as VO+vC(t) (VO is for a direct current component and vC(t) is for an alternating current component). Then, the emitter voltage (VE10,11+vE10,11 (t)) of the NPN transistors 10 and 11 is represented as follows.

It should be noted that Max{x(t), y(t)} is a function for selecting the greater to the values x(t) and y(t) each time. The base-emitter voltage of the NPN transistors 10 and 11 is defined at VBE.

$$VE10,11+vE10,11(t)=Max\{VO+vB(t), VO+vC(t)\}-VBE=Max\{vB(t), vC(t)\}+VO-VBE \quad (1).$$

The emitter voltage (VE10,11+vE10,11(t)) of the NPN transistors 10 and 11, i.e., the output signal (D) of the maximum value detection circuit 5, is input to the PNP transistor 15 in the positive component removing circuit 6, and a high band component also flows to the ground (GND) 14 via the capacitor 20 and the resistor 18. Therefore, the voltage is averaged at the base of the PNP transistor and is only for a direct current, and as a result, a voltage that is obtained by dividing the direct current voltage VE10,11 by the resistors 18 and 19 is applied to the base of the PNP transistor 16.

When the resistance of the resistor 18 is defined as R1, and the resistance of the resistor 19 is defined as R2, the voltage VB16 that is applied to the base of the PNP transistor 16 (i.e., removal reference voltage 1 with reference number 35 in FIG. 3(c) is $$VB16=\{R2/(R1+R2)\}\times VE10,11 \quad (2).$$

When R2 is much larger than R1, a difference between VB16 and VE10,11 is very slight and $$VB16\ VE10,11 \quad (3).$$

The one of the PNP transistors 15 and 16 that has a lower base voltage is selectively rendered on, and a current flows across the resistor 17 to the emitter of the activated transistor. The maximum value detection circuit practically serves as a positive component removing circuit.

When VE10,11+vE10,11(t) is lower than VB16, the NPN transistor 15 is rendered on, and a alternating current waveform having vE10,11 is therefore applied to the emitter. On the other hand, when VE16 is lower than vE10,11(t), the NPN transistor 16 is rendered on and the direct current voltage VB16+VBE is detected at the emitter.

In other words, the emitter voltage VE15,16+vE15,16(t) (VE15,16 is for a direct current component and vE15,16(t) is for an alternating current component) of the NPN transistors 15 and 16 is represented as follows by formula (3) or (1):

$$VE15, 16 + vE15, 16(t) = \quad (4)$$
$$Min\{VE10, 11 + vE10, 11(t), VB16\} + VBE$$
$$Min\{VE10, 11 + vE10, 11(t), VE10, 11\} + VBE =$$
$$m\{vE10, 11(t)\} + VE10, 11 + VBE = m[Max\{vB(t), vC(t)\}] + VO.$$

Min{x(t), y(t)} is a function for selecting the greater of the values x(t) and y(t) each time. m{x(t)} is a function for outputting a value unchanged when x(t) is negative, and for outputting O when it is O.

Likewise, the minimum value detection circuit 7 that includes the PNP transistors 23 and 24, and the resistor 25 outputs each time a minimum value for $$vB(t)+VO \text{ and } vC(t)+VO, \text{ so that } VE23,24+vE23,24(t)=Min\{VO+vB(t), VO+vC(t)\}+VBE=Min\{vB(t),vC(t)\}+VO+VBE \quad (5).$$

The emitter voltage VE23, 24+vE23,24(t) of the PNP transistors 23 and 24, which is the output signal (F) of the minimum value detection circuit 7, is applied to the base of the NPN transistor 26. Further, since the high band components of the emitter voltage VE23,24+vE23,24(t) flow to the GND via the resistor 29 and the capacitor 31, the voltage is averaged at the base of the transistor 27 and is only a direct current component. As a result, a voltage that is obtained by dividing the direct current component VE23,24 and a voltage of the power source 23 at a ratio of the resistances 20 and 30 is applied to he base of the transistor 27.

When the resistance of the resistor 29 is defined as R3, the resistance of the resistor 30 is defined at R4, and the voltage value of the power source 12 is defined as VCC, the voltage VB27 that is applied to the base of the transistor 27 (i.e., removal reference voltage 2 with reference number 36 in FIG. 3(c) is $$\begin{aligned} VB27 &= VCC - \{R4/(R3+R4)\} \times \{VCC - VE23, 24\} \quad (6)\\ &= \{R3/(R3+R4)\} \times VCC +\\ &\quad \{R4/(R3+R4)\} \times VE23, 24. \end{aligned}$$

When R4 is sufficiently larger than R3, VB27

$$VE23,24 \quad (7).$$

Similarly to when formula (4) is acquired, the NPN transistors 26 and 27 and the resister 28 can be regarded as the minimum value detection circuit. When the voltage VB27 (VE23,24) that is applied to the base of the NPN transistor 27 is compared with the VE23,24+vE23,24(t) that is applied to the base of the NPN transistor 26, and when VE23, 24 +vE23,24(t) is higher than VB27, the NPN transistor 26 is rendered on and an alternating waveform vE23,24(t) is applied to the emitter. When BB27 is lower, the NPN transistor 27 is rendered on and the direct current component VB27−VB is output to the emitter. In short, this is represented as follows:

$$VE26, 27 + vE26, 27(t) = \text{Max}\{VE23, 24 + vE23, 24(t), VB27\} - VBE \qquad (8)$$
$$= \text{Max}\{VE23, 24 + vE23, 24(t), VE23, 24\} - VBE$$
$$= p\{vE23, 24(t)\} + VE23, 24 - VBE$$
$$= p[\text{Min}\{vB(t), vC(t)\}] + VO.$$

It should be noted that p{x(t)} is a function for outputting a value unchanged when x(t) is positive, and for outputting O when it is negative or O.

Suppose that the resistances of resistors 21 and 32 are defined as RO and capacitor 22 has a large capacity that permits the band of the alternating current signal VE15,16(t) to be passed through without very much attenuation.

The alternating current voltage of the signal (H), which is the output signal in FIG. 5(i.e., the output signal of the time span shortening circuit 47) is defined as vH(t), vH(t) is obtained as follows:

$$vH(t)=m[\text{Max}\{vB(t),vC(t)\}]/2+p[\text{Min}\{vB(t),vC(t)\}]/2+VO \qquad (9),$$

wherein m{Max{vB(t),vC(t)}] is the alternating current output signal (E) of the positive component removing circuit 6, and p[Min{vB(t),vC(t)} is the alternating current output signal (G) of the negative component removing circuit 8, so that it is apparent that formula (9) matches the signal processing that is explained while referring to FIGS. 2, 3(a)–(e), and 4(a)–(f).

According to formula (3)

$$VB16+VE10,11-\{R1/(R1+R2)\}\ VE10,11\ VE10,11,$$

while a minute voltage of {R1/(R1 +R2)}VE10,11 is ignored and an approximate value is provided. This is the minute voltage 60 (Vα) that is explained while referring to FIG. 4, and $$V\alpha=\{R1/(R1+R2)\}\times VE10,11 \qquad (10).$$

In the circuit shown in FIG. 5, a voltage of Vα near the bias VO is removed from the alternating signal, in formula (9), that is $$m[\text{Max}\{vB(t), vC(t)\}t]$$

and the result is output.

Similarly, the voltage vβ of {R3/(R3+R4)}×(VCC−CE23, 24) near the bias is removed from the alternating current signal m {Max {vB(t), vC(t)}], and the result is output. In other words, $$V\beta=\{R3/(R3+R4)\}\times(VCC-VE23, 24) \qquad 11.$$

Figure 6:
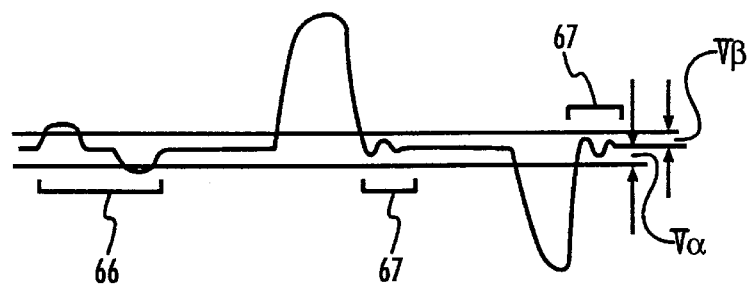
FIG. 6 is a diagram for explaining the ringing removal for a portion wherein luminance change is small.

In FIG. 6 is shown a model of an actual signal waveform of, for example, the maximum value detection circuit output signal (D).

In many cases, ringing 67 exists near the bias, and when the amplifier rate of the primary differential signal is to be increased to acquire a large effect for scanning speed modulation, the ringing portion 67 will also be amplified and scanning speed modulation will acto on that portion.

The ringing of the primary differential signal is caused by ringing of the original luminance signal, and as a result, ringing of an image itself is intensified by the effect of the scanning speed modulation.

At this time, the ringing portion between Vα and Vβ voltages in FIG. 6 is cutout, so that it is removed and scanning speed modulation does not therefore act on that portion.

A small signal output portion 66 of the primary differential signal is a portion wherein a luminance signal gradually rises or falls, or a portion wherein an amplitude change of a luminance signal is small. In many cases, such an image portion is degraded and may appear unnatural by sharpening the edge due to the scanning speed modulation. In this case, too, by cutting out the portion between voltages Vα through vβ, a portion wherein the amplitude difference of the primary differential signal is small is reduced compared with a portion wherein the differential signal is small is reduced compared with a portio wherein the amplitude difference is large. As a result, the effect on the portion with a small amplitude different is large. As a result, the effect on the portion with a small amplitude difference is decreased and the image appearance can be improved.

An image portion that tends to result in a degraded image and provide a sense of unnaturalness is, for example, the shadow of the nose on a man's face or a slight shadow on the face.

Embodiment 2

Figure 7:
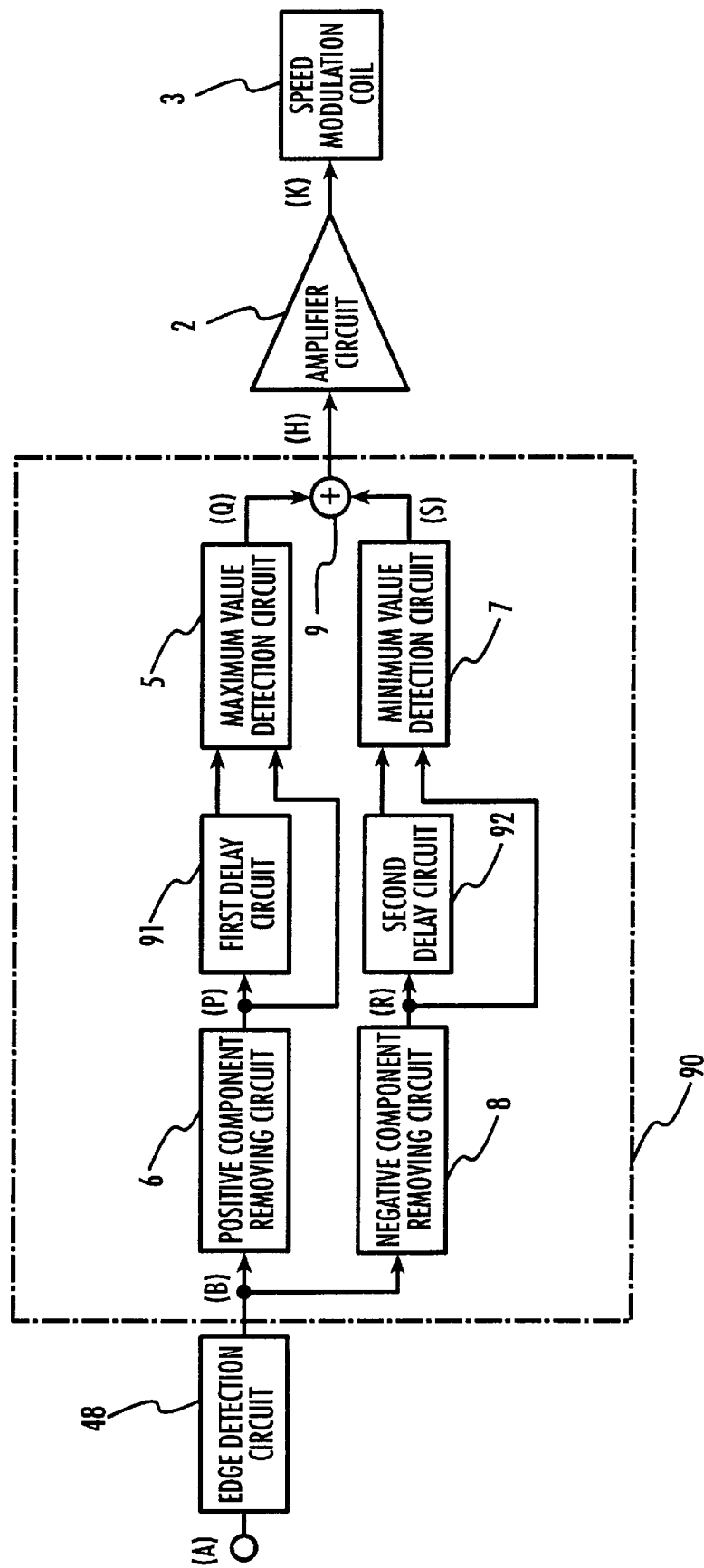
FIG. 7 is a circuit diagram illustrating the scanning speed modulation circuit according to Embodiment 2 of the invention.

FIG. 7 is a diagram illustrating the arrangement of Embodiment 2. The structure of the time span shortening circuit 47 in Embodiment 1, which has been explained while referring to FIG. 2, is changes in this Embodiment 2.

In FIG. 7, a scanning speed modulation circuit includes an edge detection circuit 48; a time span shortening circuit 90; an amplifier circuit 2; and a speed modulation coil 3, all of which are the same as those in Embodiment 1.

The time span shortening circuit 90 according to Embodiment 2 includes a positive component removing circuit 6 and a negative component removing circuit 8, which receive a primary differential signal (B) that is obtained from a luminance signal (A), which is a signal output by the edge detection circuit 48; a first delay circuit 91, for receiving a signal output by the positive component removing circuit 6; a second delay circuit 92, for receiving a signal output by the negative component removing circuit 8; a maximum value detection circuit 5, for receiving simultaneously the signal output by the positive component removing circuit 6 and by the first delay circuit 91; a minimum value detection circuit 7, for receiving simultaneously the signals output by the negative component removing circuit 8 and by the second delay circuit 92; and an adder 9 for adding the signals output by the maximum value detection circuit 5 and by the minimum value detection circuit 7 in order to output an output signal (H) of the time span shortening circuit 90.

Figure 8:
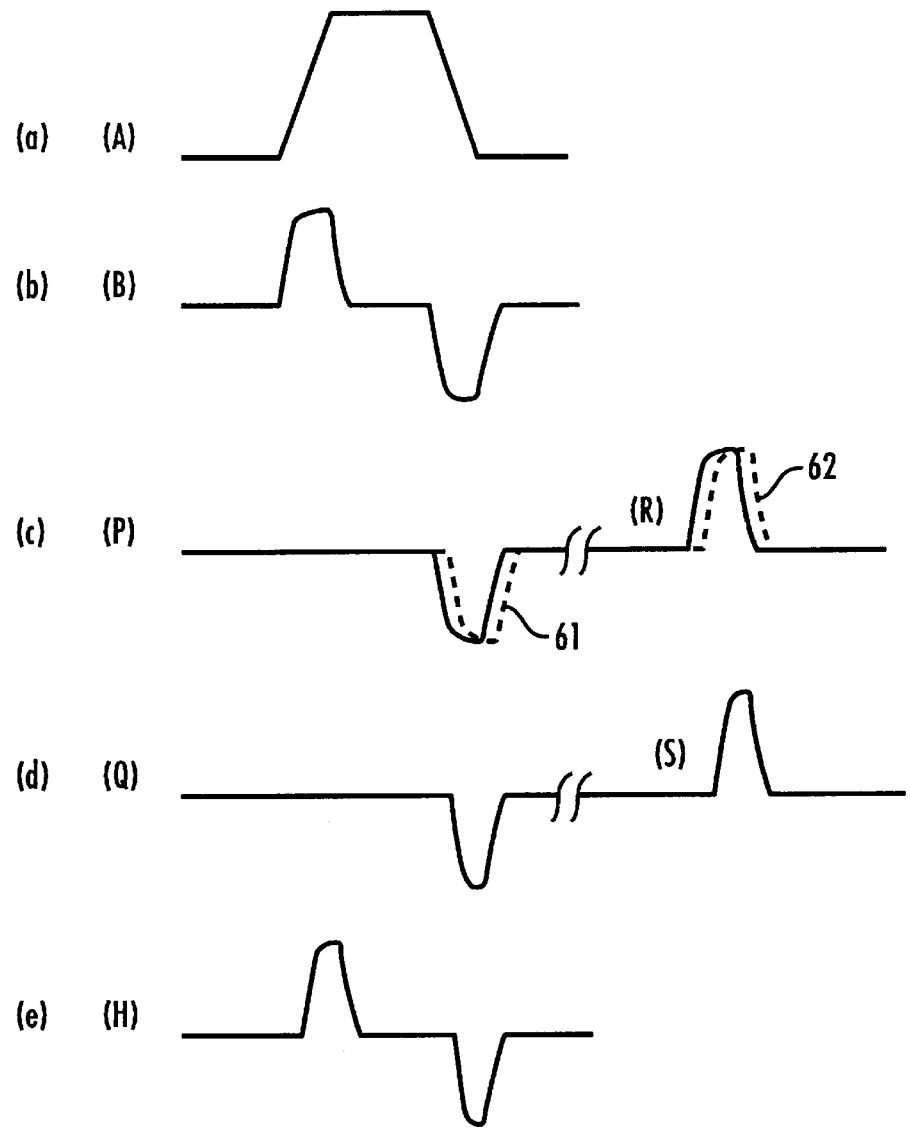
FIG. 8(a), 8(b), 8(c), 8(d) and 8(e) are diagrams for explaining the operation according to Embodiment 2 of the invention shown in FIG. 7.

In FIGS. 8(a)–(e) are shown operational signal waveforms for the individual sections in the circuit according to Embodiment 2. In FIGS. 8(a)–(e), (A) shown in FIG. 8(a) is an input luminance signal having a trapezoid shape, as in Embodiment 1, that is input to the edge detection circuit 48; (B) shown in FIG. 8(b) is a primary differential signal that is output by the edge detection circuit 48; (P) shown in FIG. 8(c) in is a signal output by the positive component removing circuit 6; (Q) show in FIG. 8(d) is a signal output by the maximum value detection circuit 5; (R) shown in FIG. 8(c) is a signal output by the negative component removing circuit 78; (S) shown in FIG. 8(d) is a signal output by the minimum value detection circuit 7; (H) shown in FIG. 8(e)

is a signal output by the adder 9. Their vertical axes represent a voltage and their horizontal axes represent time.

In addition, the solid line in the signal (P) shown in FIG. 8(c) is for a signal waveform before it is passed through the first delay circuit 91, and a dashed line 61 indicates a signal waveform after it is passed through he first delay circuit 91.

Similarly, the solid line in the signal (R) shown in FIG. 8(c) is for a signal waveform before it is passed through the second delay circuit 92, and a dashed line 61 indicates a signal waveform after it is passed through the second delay circuit 92.

A detailed explanation of the operation will not be given since the time span shortening circuit 90 acquires the output signal (H) as in Embodiment 1.

Embodiment 3

In Embodiments 1 and 2, the edge detection circuit 48, which is a differentiating circuit, is employed to detect the edge portion of the input luminance signal (A). However, with the alternative circuit structure shown in FIG. 9, the edge portion of the input luminance signal (A) can also be detected.

In the diagram, the edge detection circuit includes: a delay circuit 63 for delaying an input luminance signal (A) by a predetermined time to output signal 64 and a subtractor 65.

A difference between the input luminance signal (A) and a signal 64 that is passed through the delay circuit 63 is output as a signal (Bb) by the subtractor 65. (Bb) is an edge detection signal.

Figure 9:
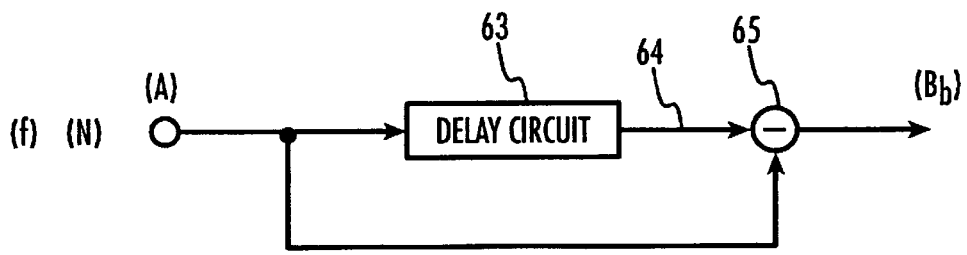
FIG. 9 is a circuit diagram showing the edge detection portion of a luminance signal according to another embodiment of the invention.
Figure 10:
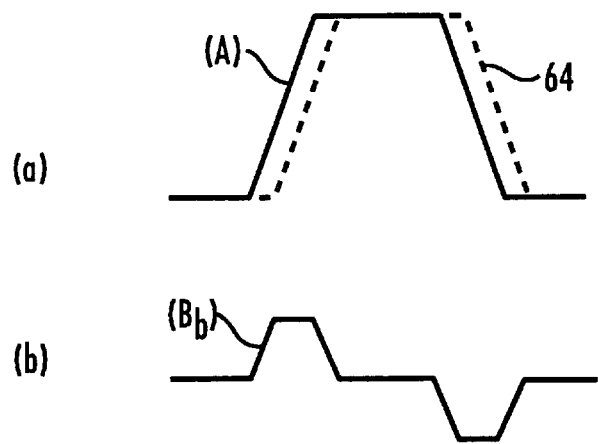
FIG. 10(a) and 10(b) are diagrams for explaining the operation according to Embodiment 3 of the invention shown in FIG. 9.
Figure 11:
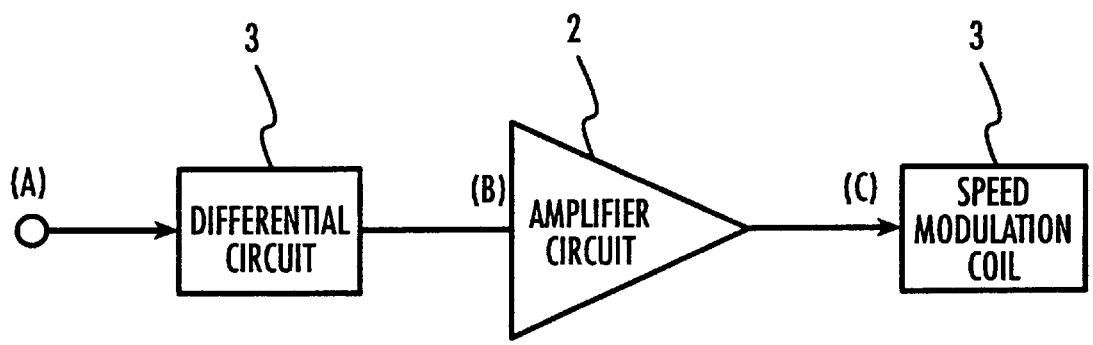
FIG. 11 is a diagram showing the arrangement of a conventional scanning speed modulation circuit.

In FIGS. 10(a) and 10(b) are shown signal waveforms for individual sections of the circuit in FIG. 9. The solid line in FIG. 10(a) indicates the input luminance signal (A) and the dashed line indicates the output signal 64 of the delay circuit 63.

In FIG. 10(b) is shown the output signal of the subtractor 65, i.e., the edge detection signal (Bb).

As described above, by acquiring the difference in the value of an input luminance signal (A) before and after it has passed through the delay circuit 63, a signal that is acquired is the same as the primary differential signal, which is the output of the edge detection circuit in Embodiments 1 and 2.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A scanning speed modulation circuit for enhancing an edge portion of an image signal by modulating a current applied to a scanning speed modulation coil, comprising:

edge detection means for detecting an edge portion of an input image signal and for outputting an edge detection pulse signal;

time span shortening means for reducing, by a predetermined amount, a time span of the edge detection pulse signal received from said edge detection means, and for outputting a compensated pulse signal having a shortened time span; and amplifier means for amplifying the compensated pulse signal received from said time span shortening means and for transmitting an output signal to the scanning speed modulation coil.

2. The scanning speed modulation circuit according to claim 1, wherein said time span shortening means includes:

a delay circuit for delaying the edge detection pulse signal received from said edge detection means for a predetermined time and for outputting a delayed pulse signal;

a maximum value detection circuit for detecting, at individual times, a maximum voltage value of the edge detection pulse signal and of the delayed pulse signal;

a positive component removing circuit for removing a positive component from an output signal of said maximum value detection circuit;

a minimum value detection circuit for detecting, at individual times, a minimum voltage value of the edge detection pulse signal and of the delayed pulse signal;

a negative component removing circuit for removing a negative component of an output signal from said minimum value detection circuit; and an adder circuit for synthesizing output signals of said positive component removing circuit and said negative component removing circuit to output the compensated pulse signal.

3. The scanning speed modulation circuit according to claim 1, wherein said time span shortening means includes:

a positive component removing circuit for removing a positive component from the edge detection pulse signal;

a negative component removing circuit for removing a negative component from the edge detection pulse signal;

a first delay circuit for delaying an output signal of said positive component removing circuit for a predetermined time and outputting a first delayed signal;

a second delay circuit for delaying an output signal of said negative component removing circuit for a predetermined time and outputting a second delayed signal;

a maximum value detection circuit for detecting, at individual times, a maximum voltage value of the output signal from said positive component removing circuit and the first delayed signal;

a minimum value detection circuit for detecting, at individual times, a minimum voltage value of the output signal from said negative component removing circuit and the second delayed signal; and an adder circuit for synthesizing output signals of said maximum value detection circuit and said minimum value detection circuit to output the compensated pulse signal.

4. The scanning speed modulation circuit according to claim 1, wherein said edge detection means includes a differentiating circuit for differentiating the input image signal to output the edge detection pulse signal.

5. The scanning speed modulation circuit according to claim 1, wherein said edge detection means includes:

a delay circuit for delaying the input image signal for a predetermined time and outputting a delayed signal, and a subtraction circuit for determining a difference between the delayed signal and the input image signal and outputting the edge detection pulse signal.

6. The scanning speed modulation circuit according to claim 2, wherein said positive component removing circuit also removes a negative component above a first predetermined level, and wherein said negative component removing circuit also removes a positive component below a second predetermined level.

7. The scanning speed modulation circuit according to claim 3, wherein said positive component removing circuit also removes a negative component above a first predetermined level, and wherein said negative component removing circuit also removes a positive component below a second predetermined level.

8. The scanning speed modulation circuit according to claim 1, wherein the time span of the edge detection pulse signal is shortened so that the compensated pulse is included within a rising time span of the input image signal in which the input image signal rises.

9. The scanning speed modulation circuit according to claim 2, wherein said delay circuit includes one of a low-pass filter, a band-pass filter, or a high-pass filter.

10. The scanning speed modulation circuit according to claim 3, wherein one of said first or second delay circuit includes one of a low-pass filter, a band-pass filter, or a high-pass filter.

11. A scanning speed modulation method for enhancing an edge portion of an image signal by modulating a current applied to a scanning speed modulation coil, comprising the steps of:

detecting an edge portion of an input image signal to output an edge detection pulse signal;

time span shortening, by a predetermined amount, a time span of the edge detection pulse signal, and for outputting a compensated pulse signal having a shortened time span; and amplifying the compensated pulse signal received from said time span shortening step and transmitting an output signal to the scanning speed modulation coil.

12. The scanning speed modulation method according to claim 11, wherein said time span shortening step includes the substeps of:

delaying the edge detection pulse signal for a predetermined time to output a delayed pulse signal;

detecting a maximum voltage value, at individual times, of the edge detection pulse signal and of the delayed pulse signal;

removing a positive component from an output of said detecting a maximum voltage value substep;

detecting a minimum voltage value, at individual times, of the edge detection pulse signal and of the delayed pulse signal;

removing a negative component of an output of said detecting a minimum voltage value substep; and synthesizing output signals of said removing a positive component substep and said removing a negative component substep to output the compensated pulse signal.

13. The scanning speed modulation method according to claim 11, wherein said time span shortening step includes the substeps of:

removing a positive component from the edge detection pulse signal;

removing a negative component from the edge detection pulse signal;

delaying an output signal of said removing a positive component substep for a predetermined time;

delaying an output signal of said removing a negative component substep for a predetermined time;

detecting a maximum voltage value, at individual times, of the output signals from said removing a positive component substep and said delaying substep that delays an output component of said removing a positive component substep;

detecting a minimum voltage value, at individual times, of the output signals from said removing a negative component substep and said delaying substep that delays an output component of said removing a negative component substep; and synthesizing output signals of said detecting a maximum value substep and said detecting a minimum value substep to output the compensated pulse signal.

14. The scanning speed modulation method according to claim 11, wherein said edge detecting step includes a differentiating substep which differentiates the input image signal to output the edge detection pulse signal.

15. The scanning speed modulation method according to claim 11, wherein said edge detection step includes the substeps of:

delaying the input image signal for a predetermined time and outputting a delayed signal, and determining a difference between the delayed signal and the input image signal and outputting the edge detection pulse signal.

16. The scanning speed modulation method according to claim 12, wherein said removing a positive component substep also removes a negative component above a first predetermined level, and wherein said removing a negative component substep also removes a positive component below a second predetermined level.

17. The scanning speed modulation method according to claim 13, wherein said removing a positive component substep also removes a negative component above a first predetermined level, and wherein said removing a negative component substep also removes a positive component below a second predetermined level.

18. The scanning speed modulation method according to claim 11, wherein the time span of the edge detection pulse signal is shortened so that said compensated pulse is included within a rising time span of the input image signal in which the input image signal rises.

19. The scanning speed modulation method according to claim 12, wherein said delaying substep includes the substeps of low-pass filtering, band-pass filtering, or high-pass filtering.

20. The scanning speed modulation method according to claim 13, wherein each said delaying substep includes the substeps of low-pass filtering, band-pass filtering, or high-pass filtering.

* * * * *

UNITED STATES PATENT AND TRADEMARK OFFICE
CERTIFICATE OF CORRECTION

PATENT NO. : 5,912,715
DATED : June 15, 1999
INVENTOR(S) : Masaaki HANAI

It is certified that error appears in the above-identified patent and that said Letters Patent is hereby corrected as shown below:

In the drawings, substitute Figs 4 and 12 therefor.

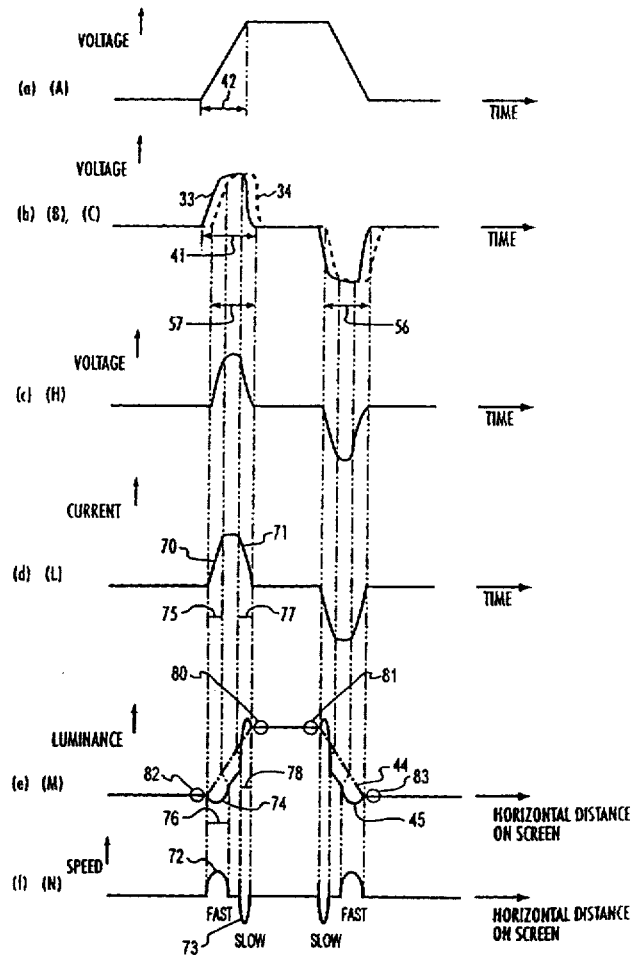

FIG 4

UNITED STATES PATENT AND TRADEMARK OFFICE
CERTIFICATE OF CORRECTION

PATENT NO. : 5,912,715
DATED : June 15, 1999
INVENTOR(S) : Masaaki HANAI

Page 2 of 3

It is certified that error appears in the above-identified patent and that said Letters Patent is hereby corrected as shown below:

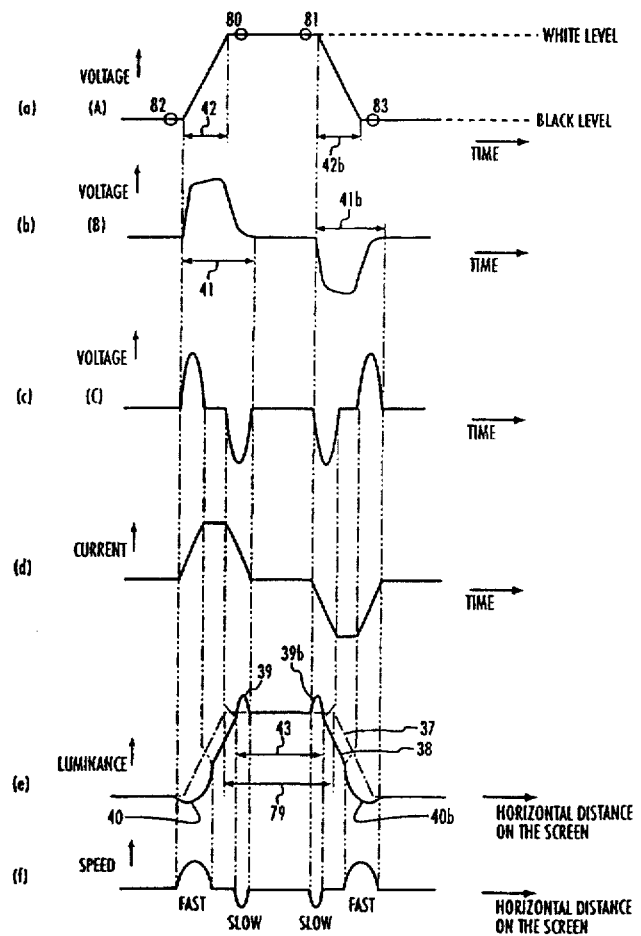

FIG 12
(Prior Art)

UNITED STATES PATENT AND TRADEMARK OFFICE
CERTIFICATE OF CORRECTION

PATENT NO. : 5,912,715
DATED : June 15, 1999
INVENTOR(S) : Masaaki HANAI It is certified that error appears in the above-identified patent and that said Letters Patent is hereby corrected as shown below:

Attest:

Signed and Sealed this

Fifteenth Day of February, 2000

Q. TODD DICKINSON

*Attesting Officer*     *Commissioner of Patents and Trademarks*